United States Patent [19]

Bethune et al.

[11] 4,243,881

[45] Jan. 6, 1981

[54] TIME-RESOLVED INFRARED SPECTRAL PHOTOGRAPHY

[75] Inventors: Donald S. Bethune, Mount Kisco; John R. Lankard, Jefferson Valley; Michael M. Loy, Mount Kisco; Peter P. Sorokin, Ossining, all of N.Y.

[73] Assignee: International Business Machines Corporation, Armonk, N.Y.

[21] Appl. No.: 84,245

[22] Filed: Oct. 12, 1979

[51] Int. Cl.$^3$ .............................................. G01J 1/00
[52] U.S. Cl. ................................. 250/338; 307/426; 356/300; 356/302
[58] Field of Search ....................... 307/426; 250/338; 356/300, 302

[56] References Cited

U.S. PATENT DOCUMENTS 3624421  11/1971  Pantell et al. ........................ 307/426

Primary Examiner—Rudolph V. Rolinec
Assistant Examiner—Darwin R. Hostetter
Attorney, Agent, or Firm—Ronald L. Drumheller

[57] ABSTRACT

An intense broadband continuum light pulse of uniform spectral intensity and short time duration is generated. This continuum pulse is then downconverted in frequency to a region of interest, preferably in the infrared region, by applying it as a pump pulse to a molecular or atomic vapor so as to induce stimulated Raman scattering. The resulting Raman Stokes pulse surprisingly tends to have the same spectral bandwidth, intensity uniformity and time duration as the pump continuum pulse.

The downconverted continuum pulse (the Raman Stokes pulse) is then used to probe a sample. The sample converts the uniform spectral intensity distribution of the probe pulse into a nonuniform spectral intensity distribution which contains the absorption spectrum of the sample. This spectrum pulse has the same spectral bandwidth and time duration as the Raman Stokes pulse and is finally upconverted in frequency to a region where the spectrum pulse can be conveniently recorded. This is done with a four-wave Raman mixing process in an alkali metal vapor. The vapor is simultaneously pumped with the spectrum pulse and with a second pumping light pulse (or beam) having a frequency in the vicinity of a suitable resonance line of the vapor so as to induce SERS. In the alkali metal vapor, the resulting Raman Stokes pulse and spectrum pulse beat together with the second pumping light pulse to produce an upconverted pulse at a higher frequency band, which surprisingly also tends to have the same spectral bandwidth, intensity distribution (spectrum) and time duration as the spectrum pulse. The upconverted pulse is then recorded either photographically or photoelectrically with conventional spectrographic apparatus.

11 Claims, 5 Drawing Figures

TIME-RESOLVED INFRARED SPECTRAL PHOTOGRAPHY

The government has rights in this invention pursuant to Contract DAAG29-76-C-0062 awarded by the U.S. Army Research Office and pursuant to Contract No. N00014-76-C-0907 awarded by the Office of Naval Research.

DESCRIPTION

1. Technical Field

This invention relates to infrared spectroscopy and more particularly to a method and apparatus for instantaneously measuring or recording a broadband infrared absorption spectrum.

2. Background Art

Infrared absorption spectroscopy is used for identifying and measuring chemical compositions. Molecules and fragments of molecules can be identified by the frequencies of infrared light they absorb. Ordinarily, an infrared absorption spectrum is obtained by irradiating a sample with infrared light having a very narrow frequency band, the center frequency of the narrow band being gradually changed or scanned either continuously or stepwise through a much broader frequency range or band. Simultaneously, the infrared light which was not absorbed by the sample is measured and recorded as a function of the irradiation frequency.

Another technique is to irradiate the sample with a broadband infrared source and to spatially distribute the frequency spectrum of the infrared light which was not absorbed by the sample for simultaneous recording. Since recording apparatus in the infrared region is not very sensitive, the sample is irradiated until the recording apparatus has received sufficient energy flux.

These techniques are perfectly acceptable when the chemical composition of the sample does not change over the time period during which the infrared band is probed or scanned. There are many situations, however, where chemical reactions occur so fast that neither a sequential scan of an infrared band nor a broadband exposure can be completed before a transient chemical condition changes. This is particularly true with pulsed chemical reactions, such as those induced by flash photolysis or laser irradiation. Fast-acting chemical reactions also occur, for example, in petroleum refining, in engine combustion, and in other high-temperature processes.

It is an object of the present invention to generate an infrared absorption spectrum in as short a time period as possible.

A further object is to generate an infrared continuum probe beam which is intense and has a uniform spectral composition.

Still another object is to upconvert an infrared spectrum to a frequency band in which the spectrum can be recorded more conveniently and with better recording sensitivity.

DISCLOSURE OF INVENTION

An intense broadband continuum light pulse of uniform spectral intensity and short time duration is generated. This continuum pulse is then downconverted in frequency to a region of interest, preferably in the infrared region, by applying it as a pump pulse to a molecular or atomic vapor so as to induce stimulated Raman scattering. The resulting Raman Stokes pulse surprisingly tends to have the same spectral bandwidth, intensity uniformity and time duration as the pump continuum pulse.

The downconverted continuum pulse (the Raman Stokes pulse) is then used to probe a sample. The sample converts the uniform spectral intensity distribution of the probe pulse into a nonuniform spectral intensity distribution which contains the absorption spectrum of the sample. This spectrum pulse has the same spectral bandwidth and time duration as the Raman Stokes pulse and is finally upconverted in frequency to a region where the spectrum pulse can be conveniently recorded. This is done with a four-wave Raman mixing process in an alkali metal vapor. The vapor is simultaneously pumped with the spectrum pulse and with a second pumping light pulse (or beam) having a frequency in the vicinity of a suitable resonance line of the vapor so as to induce SERS. In the alkali metal vapor, the resulting Raman Stokes pulse and spectrum pulse beat together with the second pumping light pulse to produce an upconverted pulse at a higher frequency band, which surprisingly also tends to have the same spectral bandwidth, intensity distribution (spectrum) and time duration as the spectrum pulse. The upconverted pulse is then recorded either photographically or photoelectrically with conventional spectrographic apparatus.

The continuum pump pulse is preferably in the visible region; downconversion is preferably to the 2-20 $\mu$m infrared region; the second pump pulse is preferably narrow band and in the visible region; upconversion is preferably to the visible region; both the downconverter and the upconverter preferably contain an alkali metal vapor; and all pulses are preferably 5 ns or less in duration.

DETAILED DESCRIPTION OF THE INVENTION

Figure 1:
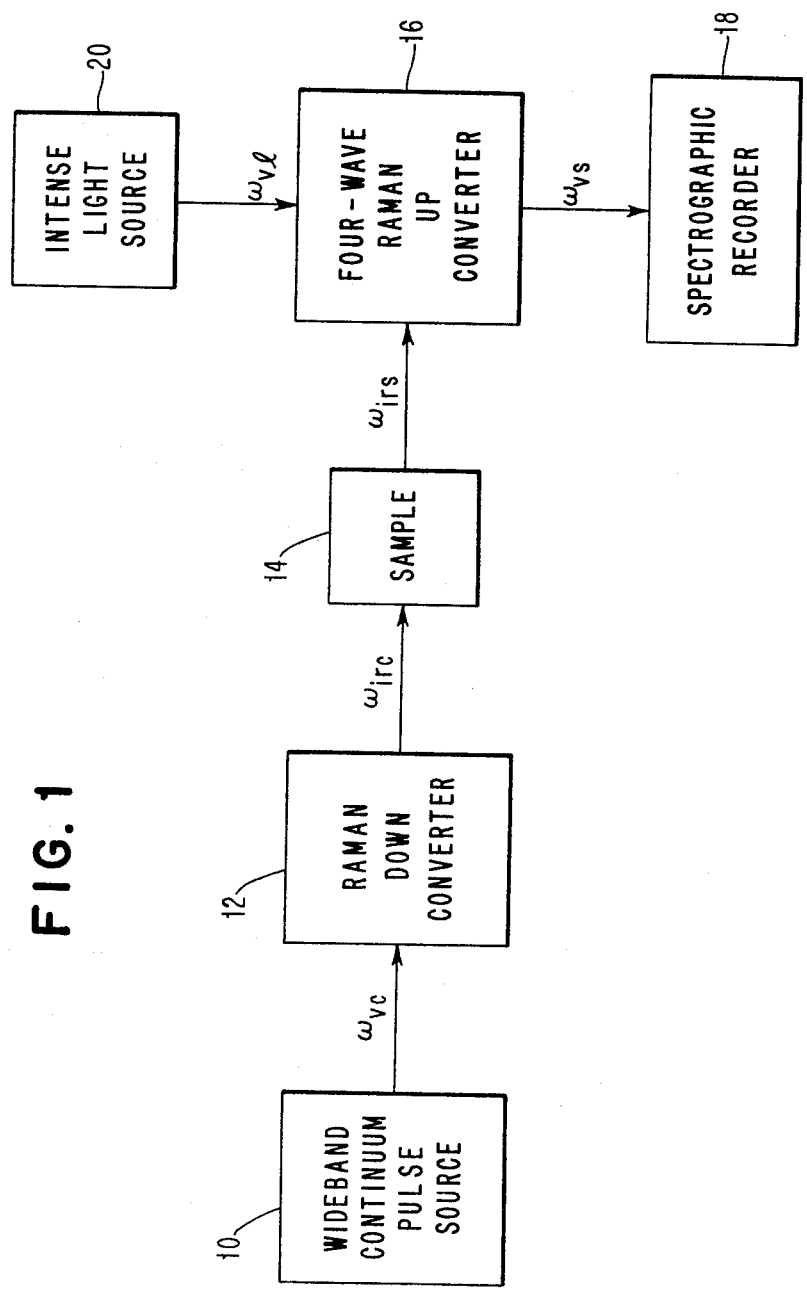
FIG. 1 is a block diagram of the invention.

Referring now to FIG. 1, a wideband continuum pulse source 10 generates a light beam pulse $\omega_{vc}$ which is as spectrally uniform in intensity as possible over a suitably wide frequency band and which also has suitably high intensity and suitably short effective time duration (pulse width). Pulses of this kind are most conveniently generated within the visible or near ultraviolet regions. However, there is no fundamental limiting factor which would prevent generation of the $\omega_{vc}$ pulse in the infrared region or in the far ultraviolet region or beyond, if suitable converter media were used.

The ultimate time resolution of the recorded absorption spectrum is defined as the effective time period during which the total spectrum is obtained. The effective time period during which the spectrum is recorded should be as short as practical. However, sufficient energy must reach the spectrographic recorder to be compatible with the sensitivity of the recorder. As the effective recording period is reduced, the intensity of the pulse reaching the recorder must be correspondingly increased. To facilitate achievement of this goal, optical gain can be added to the path before the pulse gets to the recorder. As will become more apparent, relatively high initial intensity is required to meet Raman threshold requirements in many instances. Since lasers are the most intense light sources we have at present, a laser source is preferred for generating $\omega_{vc}$.

It is theoretically possible to generate a pulse $\omega_{vc}$ which is wider (in time duration) than required or even to generate a continuous beam in place of the pulse $\omega_{vc}$ and then shutter the continuous beam or wide pulse with a controlled optical component somewhere else along the path and before the recorder. This might still produce an effective time duration which is suitably short, but this scheme is not attractive at present from energy considerations because much of the light energy which must be generated must then be deliberately removed with no apparent benefit.

As will also become more apparent, the intensity of light in the pulse $\omega_{vc}$ as a function of frequency should be as constant as possible over the band covered by the pulse. Any spectral intensity nonuniformity will appear generally also in the recorded spectrum.

However, compensation techniques can be used to effectively remove nonuniformities which do not vary from pulse to pulse, and techniques which average a number of pulses can be used to effectively eliminate random noise-like nonuniformities.

It is a feature of this invention that the continuum pulse $\omega_{vc}$ can be generated in virtually whatever frequency band allows convenient generation of the best pulse $\omega_{vc}$. This is true because the very next step in the process is a conversion of the continuum pulse $\omega_{vc}$ to the correct or desired band using a Raman down converter 12. The Raman down converter 12 includes a cell which is filled with a molecular or atomic vapor. The continuum pulse $\omega_{vc}$ is applied to the cell as a pump beam in such a fashion as to induce stimulated electronic Raman scattering (SERS) in the case of atoms or stimulated vibrational or rotational Raman scattering in the case of molecules.

In order to induce SERS, the pump continuum pulse $\omega_{vc}$ must have an intensity above a threshold value and the threshold value tends to drop, in general, as the pump frequency gets closer to a resonance line of the vapor. Thus, the pump continuum pulse $\omega_{vc}$ will generally be in the vicinity of a resonance line, though not necessarily very close to a resonance line if the pump pulse $\omega_{vc}$ has a suitably high intensity, as is preferred.

The resulting Stokes pulse $\omega_{irc}$ also is a continuum pulse and tends to have the same bandwidth and the same time duration as the pump continuum pulse. However, the frequency band is lower than the pump pulse band and usually corresponds in the case where the vapor is an alkali metal to approximately the np→ns transition associated with a resonance line. The spectral center of the $\omega_{irc}$ Stokes pulse is shifted from the frequency which exactly corresponds to the np→ns transition by an amount (in cm$^{-1}$) which is equal to the amount by which $\omega_{vc}$ departs from the selected resonance line. However, since SERS thresholds increase fairly rapidly as a pump continuum pulse is shifted away from a resonance line, it is not clear how far this effect can be extended before SERS ceases, although experiments have shown that broadband SERS can occur with detunings in excess of 1000 cm$^{-1}$. Raman Stokes transitions terminating on d states are also possible, most notably in cesium vapor, where the Raman transition represented by 6s→(6p)→5d has been made to occur. Here an advantageous feature is that the continuum pulse $\omega_{vc}$ need not be very close to the 6p resonance lines.

It should be clear that the resulting position of the frequency band of the Stokes pulse $\omega_{irc}$ depends upon the transition or vibration or rotation which has been selected. There are many atomic and molecular vapors from which one may choose. Also, in general, there are several, if not many transitions in the case of atoms and vibrations or rotations in the case of molecules which might be used for the purpose of generating a Stokes beam. However, since it is necessary to generate a $\omega_{vc}$ pulse having a frequency band which is appropriately located, choices are limited somewhat by the $\omega_{vc}$ continuum pulse frequency bands which can be conveniently generated with acceptable spectral uniformity, high intensity and short effective pulse width.

Figure 2A:
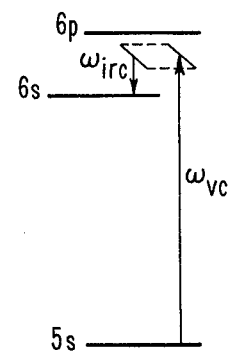
FIG. 2A is a level diagram of a Raman down converter using rubidium vapor.
Figure 2B:
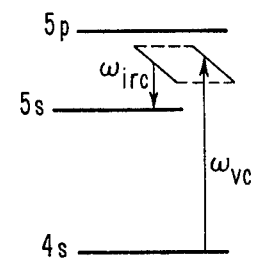
FIG. 2B is a level diagram of a Raman down converter using potassium vapor.

These relationships will be further described by using two examples. Level diagrams for rubidium vapor and for potassium vapor are shown in FIGS. 2A and 2B respectively. By applying a $\omega_{vc}$ continuum pump pulse centered at about 420 nm to rubidium vapor (FIG. 2A), 5s electrons are virtually pumped to a region around the 6p level as shown. Electrons are pumped to a virtual band of energies as shown because the pump pulse $\omega_{vc}$ is a continuum which also covers a band of corresponding bandwidth. As the excited electrons fall back to the 6s level, a Stokes pulse $\omega_{irc}$ is generated which becomes a continuum because the electrons fall back exactly to the 6s level regardless of their starting energy in the virtual energy band to which they were pumped. If the center frequency of the $\omega_{vc}$ pulse is increased, the virtual energy region to which the electrons are pumped is raised, and raised also correspondingly is the center frequency of the $\omega_{irc}$ pulse generated as the electrons fall back to the 6s level.

Table I lists the resonance lines for cesium, rubidium and potassium which have corresponding np→ns transitions that result in Stokes pulses in the infrared. FIG. 2A corresponds to the 5s→6p resonance lines shown in Table I. The corresponding wavelengths for these resonances are 420.3 and 421.7 nm depending upon which of the 5s→6p rubidium resonances are considered. Accordingly, the $\omega_{vc}$ center frequency must be in the vicinity of 420 nm to induce SERS at around the 6p level in rubidium.

TABLE I

| Alkali Metal Resonance Lines and Corresponding np → ns Infrared Frequencies | | | | | |
|---|---|---|---|---|---|
| | Resonance Lines | | Infrared Transitions | | |
| Alkali Metal | Transition | Wavelength (nm) | Transition | Frequency (cm$^{-1}$) | Wavelength ($\mu$m) |
| Cs | 6s → 7p$_{3/2}$ | 455.7 | 7p$_{3/2}$ → 7s | 3411 | 2.93 |
| | 6s → 7p$_{\frac{1}{2}}$ | 459.4 | 7p$_{\frac{1}{2}}$ → 7s | 3230 | 3.10 |
| | 6s → 8p$_{3/2}$ | 387.7 | 8p$_{3/2}$ → 8s | 1475 | 6.78 |
| | 6s → 8p$_{\frac{1}{2}}$ | 389.0 | 8p$_{\frac{1}{2}}$ → 8s | 1392 | 7.18 |

TABLE I-continued
Alkali Metal Resonance Lines and Corresponding np → ns Infrared Frequencies

| Alkali Metal | Resonance Lines | | Infrared Transitions | | |
|---|---|---|---|---|---|
| | Transition | Wavelength (nm) | Transition | Frequency (cm$^{-1}$) | Wavelength ($\mu$m) |
| | 6s → 9p$_{3/2}$ | 361.2 | 9p$_{3/2}$ → 9s | 771 | 12.96 |
| | 6s → 9p$_{\frac{1}{2}}$ | 361.8 | 9p$_{\frac{1}{2}}$ → 9s | 727 | 13.76 |
| | 6s → 10p$_{3/2}$ | 347.8 | 10p$_{3/2}$ → 10s | 454 | 22.04 |
| | 6s → 11p$_{3/2}$ | 339.9 | 11p$_{3/2}$ → 11s | 291 | 34.35 |
| Rb | 5s → 6p$_{3/2}$ | 420.3 | 6p$_{3/2}$ → 6s | 3659 | 2.73 |
| | 5s → 6p$_{\frac{1}{2}}$ | 421.7 | 6p$_{\frac{1}{2}}$ → 6s | 3582 | 2.79 |
| | 5s → 7p$_{3/2}$ | 358.8 | 7p$_{3/2}$ → 7s | 1559 | 6.42 |
| | 5s → 8p$_{3/2}$ | 335.0 | 8p$_{3/2}$ → 8s | 807 | 12.39 |
| K | 4s → 5p$_{3/2}$ | 404.5 | 5p$_{3/2}$ → 5s | 3693 | 2.71 |
| | 4s → 5p$_{\frac{1}{2}}$ | 404.8 | 5p$_{\frac{1}{2}}$ → 5s | 3674 | 2.72 |

The amount by which one can move the pump pulse $\omega_{vc}$ away from a 5s→6p resonance line and still get SERS depends largely upon how intense the $\omega_{vc}$ pulse is. As shown also in Table I, electrons falling from a virtual state around the 6p level to the 6s level emit light having a frequency of about 3600 cm$^{-1}$. By using a strong $\omega_{vc}$ pulse which is also tunable, the entire range from 2600 to 4000 cm$^{-1}$ has been reached in practice using the 6p→6s transition of rubidium.

FIG. 2B is a level diagram for potassium. In this case, the 4s→5p resonances have been selected. From Table 1, it can be seen that the resonances are at 404.5 nm and 404.8 nm. Therefore, the center wavelength for the $\omega_{vc}$ continuum pump pulse should be in the vicinity of 405 nm. The corresponding 5p→5s transition results in a Stokes frequency of about 3700 cm$^{-1}$. 3693 and 3674 are the exactly corresponding Stokes frequencies from which one may depart to some extent (limited by the $\omega_{vc}$ pulse intensity) by varying the $\omega_{vc}$ frequency.

From Table 1 it can be seen that Stokes pulses $\omega_{irc}$ of widely varying frequency can be reached using transitions of alkali metal vapors, provided of course that the necessary and corresponding $\omega_{vc}$ pulse can be conveniently generated. In addition to alkali metal vapors, it is expected that alkaline earth elements may be used, such as barium and calcium, rare earth elements such as europium, and simple molecules such as hydrogen (H$_2$).

The Raman down converted pulse is applied to a sample 14 and interacts therewith to produce a spectrum pulse $\omega_{irs}$ containing an absorption spectrum. Under certain conditions other spectra can be produced, such as a magnetic rotation spectrum. Sample 14 is generally but not necessarily in the form of a vapor. Spectrum pulse $\omega_{irs}$ is generally a transmission pulse but it could in principle also be a reflection pulse. Pulse $\omega_{irs}$ has the same bandwidth and time duration as pulse $\omega_{irc}$, but the spectral intensity distribution is no longer uniform.

A four-wave Raman up converter 16 is then used to shift the frequency band of the spectrum pulse $\omega_{irs}$ to a higher frequency range where the spectrum can be conveniently recorded by a spectrographic recorder 18. This is done with a four-wave Raman mixing process using any suitable atomic vapor. Alkali metal vapors are preferred. The vapor is simultaneously pumped with the spectrum pulse $\omega_{irs}$ and with a second pumping light pulse (or beam) $\omega_{vl}$ generated by light source 20 and having a frequency in the vicinity of a suitable resonance line of the vapor so as to induce SERS. In the vapor a Raman Stokes pulse or beam is generated in much the same manner as described earlier in connection with the Raman down converter 12. In this case however, the light pulse or beam $\omega_{vl}$ need not be wideband, and if it is wideband, the spectral intensity may be nonuniform. Since it is more convenient to generate narrow band pulses, pulse $\omega_{vl}$ is preferably narrow band.

Figure 3:
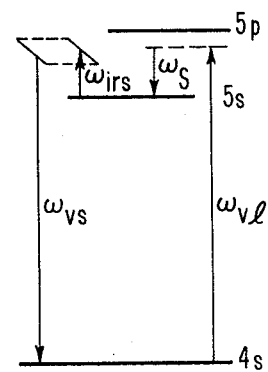
FIG. 3 is a level diagram of a four-wave Raman up converter using potassium vapor.

FIG. 3 is a level diagam of a four wave Raman up convertr cell using potassium vapor. Light pulse $\omega_{vl}$ is illustrated as a narrow band pulse pumping electrons from the 4s level to a virtual state close to the 5p level. From this state, these excited electrons fall back to the 5s level and generate a Stokes pulse $\omega_s$. Spectrum pulse $\omega_{irs}$ is simultaneously applied to the same vapor where the three pulses $\omega_{vl}$, $\omega_s$ and $\omega_{irs}$ interact and beat against each other to produce a fourth pulse $\omega_{vs}$. FIG. 3 illustrates this by a pumping of electrons from the 5s level to virtual states within a virtual band as shown, from which the electrons fall to the 4s level and generate the pulse $\omega_{vs}$. It has been very surprising to find that the pulse $\omega_{vs}$ has the same spectral intensity distribution as the $\omega_{irs}$ pulse, except of course that all frequencies have been shifted up by an equal amount. This faithful reproduction of the spectral intensity distribution was surprising because the presence of resonance lines was expected to cause nonuniformity in gain with respect to frequency.

The up converted spectrum pulse $\omega_{vs}$ is then recorded with conventional spectrographic apparatus such as on film with a spectrograph or electronically with a spectrometer.

Best Mode For Carrying Out The Invention

Figure 4:
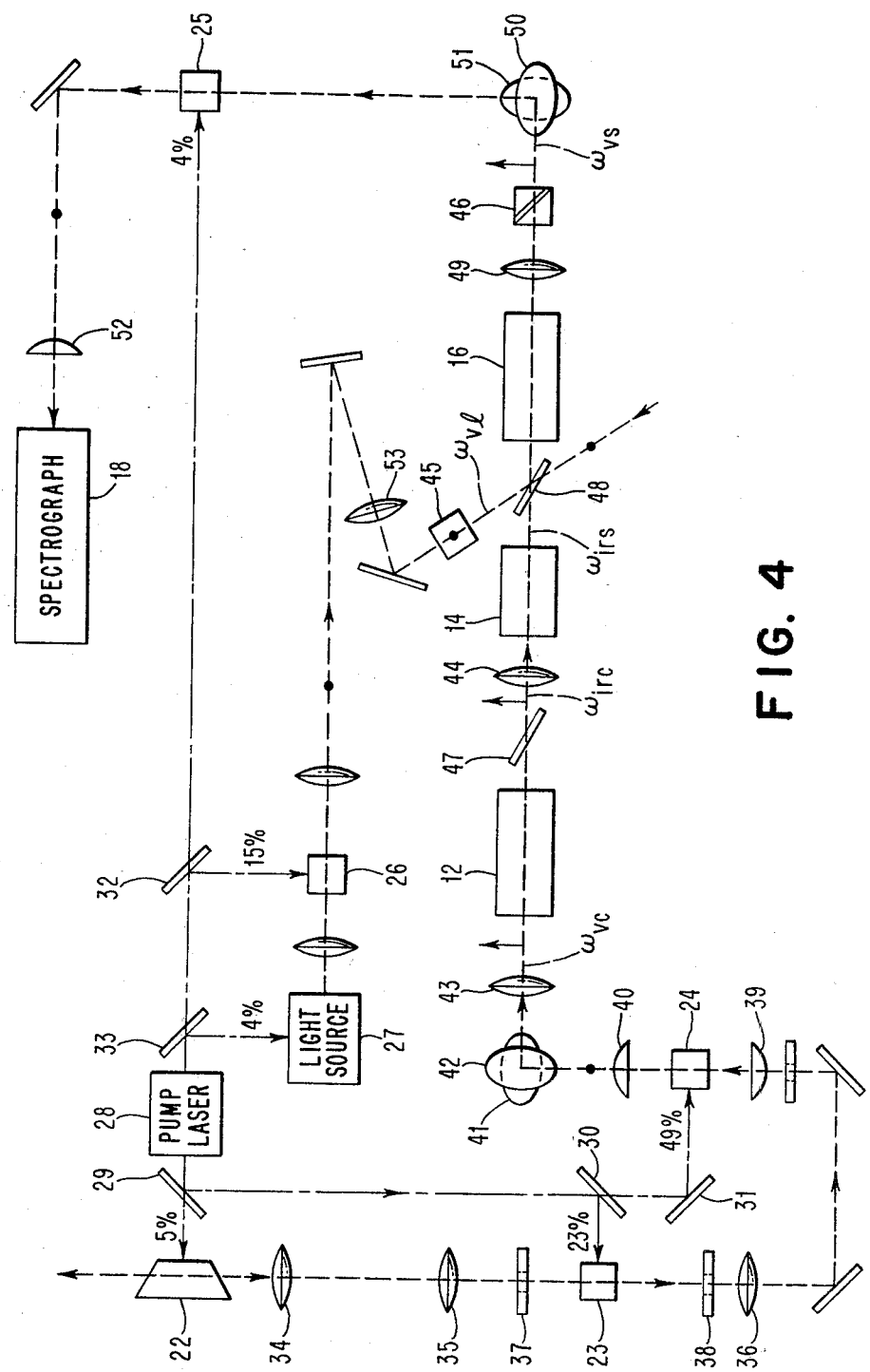
FIG. 4 is a schematic diagram of an embodiment of the invention.

We have published a very complete and detailed description of our experimental work in this field in the IBM J. Res. Develop., Vol. 23 at pages 556–575 (Sept. 1979) which is hereby incorporated by reference. The experimental apparatus is illustrated by schematic diagram of FIG. 4. Pump radiation for five transversely pumped dye cells 22–26 as well as for a sixth dye cell in light source 27 are all supplied from a single pump laser 28. The laser output from laser 28 is shown as coming from both ends thereof for convenience. A single output may be used instead. Coated beam splitters 29–33 divide up the useful pump power by the percentages shown. Each pump beam was ultimately focussed with a cylindrical lens (not shown) through an NaCl diffuser (not shown) made by wetting one surface of an NaCl window and allowing it to dry. The purpose in intentionally blurring the pump beam was to produce a relatively uniform rectangular pumped region in each dye cell. Laser 28 is a Nd$^{3+}$:YAG oscillator-amplifier producing a vertically polarized ultra-violet third harmonic beam ($\lambda$=0.355 $\mu$m).

A visible continuum was produced by a three-stage system. The first cell 22 produces a superfluorescent beam $\approx 1000$ cm$^{-1}$ wide and has windows tilted at approximately 10° to eliminate reflection feedback. Three lenses 34–36, a pair of apertures 37, 38, and a preamplifier cell 23 are used to produce a well-collimated amplified beam, which is then sent to the final amplifier 24. Cell separations between cells 23–24 are large enough to prevent interactive feedback between the various cells. To avoid very high pump intensities at cell 24, the continuum beam is compressed horizontally but not vertically. Cylindrical lenses 39 and 40 serve this purpose. The uv pumping beams and the dye laser beams passing through the various dye cells are all vertically polarized. Two mirrors 41, 42 tilted at 45° to the horizontal, with centers vertically aligned are used to rotate the plane of polarization of the continuum beam from the vertical to the horizontal in the section of the optical path occupied by the Raman cells 12, 16. Lens 43 is a 50-cm lens that focuses the visible continuum beam $\omega_{vc}$ into the center of Raman cell 12. For most of the experiments we reported in the above-identified article, Raman cell 12 is a Rb-vapor heat-pipe oven operating at $\approx 1$ kPa (9 torr.). Both ends of Raman cell 12 are terminated in Brewster angle windows, the output window being of LiF or BaF$_2$ to pass a broad band ir beam $\omega_{irc}$ generated in cell 12. The input window of cell 16 is also made of BaF$_2$, as is the 30-cm lens 44 which focusses the ir beam into the center of cell 16. Gaseous sample cell 14 is 18 cm long and equipped with NaCl windows.

Continuum and dye laser powers have been measured with the system operating at 10 pulses per second (pps). Typically, at the entrance to cell 12, the 2-mm-diameter continuum beam $\omega_{vc}$ was measured to have $\leq$3–5 mJ of energy per pulse. The highest pulse energy we have measured for $\omega_{vc}$ was 10 mJ, with p-bis(o-methylstyryl)-benzene (bis-MSB) in p-dioxane used in cells 22 and 23 and p-bis[2-(5-phenyloxazolyl)benzene] (POPOP) in p-dioxane used in cell 24. The maximum energy per pulse produced at 0.355 $\mu$m by the pump laser 28 was $\approx 100$ mJ. For the beam $\omega_{vl}$, the energy per pulse measured just after the amplifier cell 26 was usually $\approx 1$ mJ. Diphenyl stilbene (DPS) in p-dioxane was used in the dye cell in light source 27 as well as in cell 27 in all of our reported experiments. Dye cells 23, 25, 26 and the dye cell in light source 27 were all fused quartz cells, 1 cm on a side, tilted at Brewster's angle for maximum transmission of the vertically polarized dye laser beams. They were equipped with small magnetically driven stirrers, as was also cell 22. In the case of cell 24, the dye solution continuously circulated from a one-liter reservoir. As a general rule, dye solutions were changed at least once a day in the smaller cells.

Alignment is done by overlapping $\omega_{vl}$ and $\omega_{vc}$ coaxially in cell 16. Convenient indicators that the Raman thresholds are exceeded are a narrow band yellow beam ($\omega_{vl} - 2\omega_s$) produced in the second cell 16 and its broad band analogue, an orange continuum beam ($\omega_{vc} - 2\omega_{irc}$) produced in the first cell 12. Since these beams propagate coaxially with $\omega_{vl}$ and $\omega_{vc}$, respectively, they can also be used for alignment purposes.

A tunable narrow band dye laser beam is generated in a standard Hansch-type configuration incorporated in light source 27 and is subsequently amplified in cell 26. This beam is predominantly vertically polarized, and a Glan prism 45 rejects any remnant horizontally polarized component. A 100-cm lens 53 brings this pump beam $\omega_{vl}$ to a focus at the center of the four-wave Raman up converter 16. In all of our reported work, we used K vapor at 0.6 kPa (5 torr) in cell 16. The portion of $\omega_{vl}$ transmitted through cell 16 is almost completely nulled by Glan prism 46 without attenuation of the upconverted beam $\omega_{vs}$, since the latter is generated with horizontal polarization.

Two polished silicon wafers 47, 48 set at Brewster's angle for the infrared serve multiple functions. The visible continuum $\omega_{vc}$ is blocked by wafer 47, while wafer 48 couples the beam $\omega_{irc}$ into the up converter cell 16. Wafer 48 also couples a CO$_2$ laser beam into the sample cell when it is needed to initiate reactions therein to be monitored by spectral photography. Silicon wafers afford broad band ir capabilities not provided by Glan prisms.

The upconverted beam $\omega_{vs}$ collimated by lens 49 and with its polarization rotated back to vertical by mirrors 50, 51 is then sent to an optional amplifier dye cell 25, and finally, for recording, to a 1.5-m grating spectrograph with entrance slits generally set at 50 $\mu$m. A cylindrical lens 52 focusses the beam on the slit. All optical paths are adjusted for proper timing of the visible continuum and dye laser pulses with respect to a 5-ns UV pump pulse. Pulses $\omega_{irs}$ and $\omega_{vl}$ are also arranged to be synchronous at the position of the beam-combining element 48. with the ir continuum blocked, the narrow band laser beam $\omega_{vl}$ is nulled by adjusting polarizer 46. Unblocking $\omega_{irc}$ then makes visible the upconverted beam $\omega_{vs}$ which is well collimated and generally bright enough to be easily seen in a dimly lit room. Cell 25 is used to amplify the weaker portions of the upconverted beam spectrum. These usually correspond to the limits of the ir probing range.

Industrial Applicability

This invention may be readily used to take broad band infrared spectral photographs of the "fingerprint" region (2–20 $\mu$m) of organic molecules. It is particularly valuable in studying or monitoring transient chemical processes of any kind and particularly when the process involves organic molecules.

Having thus described our invention, what we claim as new, and desire to secure by Letters Patent is:

1. Apparatus for recording a spectrum produced by interacting a light beam with a sample, comprising:
   a first intense light source for producing a first continuum light beam;
   a Raman down converter cell responsive to said first continuum beam for generating a second continuum light beam of lower frequency;
   means for irradiating a sample with said second continuum beam to produce a third interaction beam carrying spectral information;
   a second intense light source for producing a fourth light beam;
   a four-wave Raman up converter cell responsive to said fourth light beam and to said third interaction beam for generating a final fifth light beam of higher frequency carrying the same spectral information; and
   means for recording said final fifth beam.

2. Apparatus as defined in claim 1 wherein said first light beam is pulsed.

3. Apparatus as defined in claim 2 wherein said fourth light beam is pulsed.

4. Apparatus as defined in claim 1 wherein said first continuum beam is above the infrared region.

5. Apparatus as defined in claim 4 wherein said second continuum beam is within the infrared region.

6. Apparatus as defined in claim 5 wherein said third interaction beam is within the infrared region.

7. Apparatus as defined in claim 5 wherein said fourth light beam is above the infrared region.

8. Apparatus as defined in claim 7 wherein said fourth light beam is narrow band.

9. Apparatus as defined in claim 7 wherein said fifth light beam is above the infrared region.

10. Apparatus as defined in claim 1 wherein said first light beam is pulsed and each pulse has a time duration of about 5 ns or less.

11. Apparatus as defined in claim 1 wherein said first light beam is pulsed and each pulse has a time duration on the order of the shortest time duration available.

* * * * *